US012746529B2

(12) United States Patent
Lim et al.

(10) Patent No.: US 12,746,529 B2
(45) Date of Patent: Sep. 29, 2026

(54) HYBRID MICRO-GAS CHROMATOGRAPHY COLUMN

(71) Applicant: KOOKMIN UNIVERSITY INDUSTRY ACADEMY COOPERATION FOUNDATION, Seoul (KR)

(72) Inventors: Si-Hyung Lim, Seoul (KR); Yeongseok Lee, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 330 days.

(21) Appl. No.: 18/503,496

(22) Filed: Nov. 7, 2023

(65) Prior Publication Data

US 2024/0149243 A1 May 9, 2024

(30) Foreign Application Priority Data

Nov. 8, 2022 (KR) ........................ 10-2022-0147952
May 3, 2023 (KR) ........................ 10-2023-0057453

(51) Int. Cl.
*B01J 20/22* (2006.01)
*B01D 53/02* (2006.01)

(52) U.S. Cl.
CPC .......... *B01J 20/226* (2013.01); *B01D 53/025* (2013.01); *B01D 2257/708* (2013.01)

(58) Field of Classification Search
None
See application file for complete search history.

(56) References Cited

U.S. PATENT DOCUMENTS 5,288,310 A * 2/1994 Peters .................... G01N 30/40 96/104
2015/0204827 A1* 7/2015 Duraffourg ........ G01N 30/7206 250/288
2024/0149243 A1* 5/2024 Lim .................... B01D 53/025

FOREIGN PATENT DOCUMENTS

CN 120369870 A * 7/2025 ......... G01N 30/8679
CN 120923829 A * 11/2025

(Continued)

OTHER PUBLICATIONS

Yan et al., Anal. Chem. 82, p. 1365-1370 (2010 (MOF-5 Metal? Organic Framework as Sorbent for In-Field Sampling and Preconcentration in Combination with Thermal Desorption GC/MS for Determination of Atmospheric Formaldehyde | Analytical Chemistry (Year: 2010).*

(Continued)

*Primary Examiner* — Brit E. Anbacht
(74) *Attorney, Agent, or Firm* — SALIWANCHIK, LLOYD & EISENSCHENK

(57) ABSTRACT

The present disclosure provides a hybrid micro-gas chromatography column including a metal-organic framework (MOF) coating the inner wall of a channel, wherein the MOF is used as an adsorbent and a stationary phase for volatile organic compounds (VOCs) so that preconcentration and separation of VOCs are performed simultaneously. According to the present disclosure, it is possible to effectively achieve miniaturization of a portable gas chromatography (GC) system by providing a hybrid micro-gas chromatography column capable of simultaneously performing preconcentration and separation of low-concentration volatile organic compounds (VOCs).

4 Claims, 9 Drawing Sheets

(56) References Cited

FOREIGN PATENT DOCUMENTS

| | | | | | |
|---|---|---|---|---|---|
| KR | 10-2016-0074513 | A | | 6/2016 | |
| KR | 10-2020-0052242 | A | | 5/2020 | |
| KR | 20240123968 | A | * | 8/2024 | ......... G01N 30/6095 |
| WO | WO-2025046306 | A1 | * | 3/2025 | ........... G01N 33/497 |

OTHER PUBLICATIONS

Li et al., Separation and Purification Technology vol. 235, Mar. 18, 2020, 116213, (Adsorption materials for volatile organic compounds (VOCs) and the key factors for VOCs adsorption process: A review—Science Direct) (Year: 2020).*

Bao et al. (Talanta, 154 (2016) 360-366). (An immobilized carboxyl containing metal-organic framework-5 stationary phase for open-tubular capillary electrochromatography—Science Direct) (Year: 2016).*

Narayanan (IEEE Sensors Journal, vol. 12, No. 6, Jun. 2012 ) (Two-Port Static Coated Micro Gas Chromatography Column With an Embedded Thermal Conductivity Detector | IEEE Journals & Magazine | IEEE Xplore) (Year: 2012).*

Office Action dated Apr. 1, 2025 in Korean Application No. 10-2023-0057453.

Lee, J., et al., "Development of Open-Tubular-Type Micro Gas Chromatography Column with Bump Structures," Sensors, Aug. 26, 2019, 19(3706):1-13.

Lee, Y., et al., "Fabrication of a MOF-5-based capillary column for high-resolution gas chromatographic separation of multiple type hydrocarbons," Department of Mechanical System, Kookmin University, Mar. 28, 2022, pp. 1-25. [Manuscript].

* cited by examiner

| Element | Weight % | Atomic % |
|---|---|---|
| C | 68.3 | 79.1 |
| O | 21.4 | 18.7 |
| Zn | 10.3 | 2.2 |
| Total | 100.0 | 100.0 |

HYBRID MICRO-GAS CHROMATOGRAPHY COLUMN

CROSS-REFERENCE TO RELATED APPLICATIONS

This application claims the benefit of Korean Application Nos. 10-2022-0147952, filed Nov. 8, 2022; and 10-2023-0057453, filed May 3, 2023; which are hereby incorporated by reference in their entirety.

BACKGROUND

1. Technical Field

The present disclosure relates to a hybrid micro-gas chromatography column, and more specifically, to a hybrid micro-gas chromatography column fabricated by coating the inner wall of a micro-gas chromatography column channel with a metal-organic framework (MOF) in order to miniaturize a portable gas chromatography (GC) system, wherein the hybrid micro-gas chromatography column is capable of simultaneously performing preconcentration and separation of low-concentration volatile organic compounds (VOCs).

2. Related Art

In general, volatile organic compounds (VOCs), including benzene, toluene, ethylbenzene, and xylene (BTEX), are air pollutants that can cause dizziness, headaches with prolonged exposure, even at low concentrations. In severe cases, these air pollutants can cause carcinogenic effects, asthma, leukemia, and fetal deformities. Therefore, safe exposure limits for these VOCs have been continuously adjusted downward worldwide.

However, when VOC concentrations are as low as ppb and mixed with interfering species, it is difficult to qualitatively and quantitatively analyze the species and concentrations of indoor hazardous multi-species VOC mixtures with a single gas sensor or sensor array due to the sensor's insufficient sensitivity or selectivity.

In this regard, gas chromatography (GC) systems are used to analyze complex VOC mixtures in indoor air monitoring applications. GC systems are typically in the form of commercial bench-top analytical instruments equipped with a high-performance detector such as a mass spectrometer (MS) or a flame ionization detector (FID).

These GC systems are typically composed of a gas preconcentrator, a gas separation column, and a detector. Gas mixtures at low concentrations of ppb levels are collected and preconcentrated in the preconcentrator for a certain period of time, and the preconcentrated VOCs are transported to the gas separation column by a carrier gas as a heating pulse is applied. The individual gas components of the VOC mixture are transported to the end of the column by an inert gas such as helium or nitrogen used as the carrier gas, and are eluted at different times through interaction with the stationary phase on the inner wall of the column. That is, the VOC mixture is separated into individual gas components. Each of the separated VOC components is detected at the exit site using various detectors such as MS and FID.

More specifically, most detectors fail to detect target VOCs at low concentrations due to an insufficiently low limit of detection (LOD). Therefore, the preconcentration of VOCs is an essential process. In general, analytes are collected and preconcentrated by a thermal desorption (TD) tube typically made of glass or steel tubes packed with adsorbent materials. After preconcentration, the VOCs adsorbed on the adsorbent in the TD tube are thermally desorbed using TD equipment. A combination of TD tube and TD equipment is called a TD system and can provide excellent sensitivity enhancement.

Meanwhile, the GC column separates a VOC mixture into individual gas components over time. The GC column is coated or loaded with various functional materials, referred to as a stationary phase, inside a long channel which is 15 to 60 m in length. The elution time of the gas components separated through the GC column is called the retention time and can be used as an identifier of the gas species. The oven equipped in the GC system also provides temperature control of the column to enhance the separation efficiency and reproducibility for the gas mixture. A GC system is defined as including a GC column and GC oven equipment.

In this regard, a variety of commercially available, high-performance TD and GC systems are currently manufactured by companies specializing in chemical analysis. However, conventional TD and GC systems typically are bulky (>1 $m^3$), are expensive (>$100,000), and require substantial power consumption of more than 2 kW. An analysis time of more than 1 hour is also required by most such systems, including warm-up/cool-down times, and most such systems require highly trained technicians. As a result, these systems are not portable and are challenging to use for on-site and real-time analysis.

The need for portable GC systems for on-site analysis has driven the continued miniaturization of hardware in TD and GC systems. Over the past few decades, numerous studies have been reported on the development of chip-based TD and GC systems with the goal of producing portable GC systems. These studies have led to the development of micro gas preconcentrators and micro GC column chips that miniaturize traditional TD and GC systems, respectively, and several portable GC systems for on-site analysis have recently been reported that integrate them with mini detectors. However, the reported portable GC systems still suffer from size and weight issues that make them inaccessible to the average person for portable and on-site analysis, making it difficult for them to become commonplace.

In this regard, US Patent Application Publication No. 2004/0255643 (hereinafter referred to as Patent Document 1) discloses a high-performance separation microcolumn assembly comprising; a substrate having a plurality of closed-spaced, gas flow microchannels etched therein; a cover connected to the substrate to sealingly close the microchannels, the substrate and the cover forming a separation column; and at least one heater and at least one sensor integrated with the separation column to enhance performance of the separation column, and a method of making the same.

In addition, Korean Patent Application Publication No. 10-2016-0074513 (hereinafter referred to as Patent Document 2) discloses a mixed matrix polymeric membrane comprising a polymeric matrix and a plurality of at least first metal-organic frameworks (MOFs), wherein the plurality of first MOFs are attached to the polymeric matrix through covalent or hydrogen bonds or Van der Waals interaction.

However, both Patent Documents 1 and 2 do not disclose a hybrid micro-gas chromatography (GC) column capable of simultaneously performing preconcentration and separation of low-concentration multiple volatile organic compounds (VOCs). Under this background, the inventors of the present disclosure have made extensive efforts to solve the above-described problems, and as a result, have developed a hybrid micro-gas chromatography column (hereinafter sometimes referred to as a hybrid μ-GC column chip) capable of simultaneously performing preconcentration of low-concentration VOCs, which is the function of a preconcentrator, and separation of low-concentration VOCs, which is the function of a gas separation column, in a single chip, in order to miniaturize a portable GC system, thereby completing the present disclosure.

PRIOR ART DOCUMENTS

Patent Document 1: US Patent Application Publication No. 2004/0255643

Patent Document 2: Korean Patent Application Publication No. 10-2016-0074513

SUMMARY

An object of the present disclosure is to provide a hybrid micro-gas chromatography column fabricated by coating the inner wall of a micro-gas chromatography column channel with a metal-organic framework (MOF) in order to miniaturize a portable gas chromatography (GC) system, wherein the hybrid micro-gas chromatography column is capable of simultaneously performing preconcentration of low-concentration VOCs, which is the function of a preconcentrator, and separation of low-concentration VOCs, which is the function of a gas separation column.

The present disclosure will be described below in detail. Meanwhile, each description and embodiment disclosed in the present disclosure may also be applied to other descriptions and embodiments. That is, all combinations of various elements disclosed in the present disclosure fall within the scope of the present disclosure. Furthermore, the scope of the present disclosure is not construed as being limited by the specific description described below.

To achieve the above object, an aspect of the present disclosure provides a hybrid micro-gas chromatography column including a metal-organic framework (MOF) coating the inner wall of a channel, wherein the MOF is used as an adsorbent and a stationary phase for volatile organic compounds (VOCs) so that preconcentration and separation of VOCs are performed simultaneously.

In addition, according to the present disclosure, the MOF may include a metal ion and an organic ligand coordinated to the metal ion, wherein the metal ion may be selected from the group consisting of zirconium (Zr), aluminum (Al), iron (Fe), cobalt (Co), nickel (Ni), copper (Cu), zinc (Zn), manganese (Mn), magnesium (Mg), chromium (Cr), indium (In), vanadium (V), and gallium (Ga) ions, and the organic ligand may be selected from the group consisting of dicarboxylic acid, tricarboxylic acid, tetracarboxylic acid, and imidazolate.

In addition, according to the present disclosure, the MOF may be selected from the group consisting of UiO-66, UiO-67, UiO-68, MOF-5, MOF-69, MOF-74, MOF-177, MOF-199, MOF-508, MOF-801, MOF-804, MOF-805, MOF-806, MOF-808, MOF-812, MOF-841, NU-100, NU-110, NU-1000, DUT-49, DUT-52, DUT-53, DUT-67, ZIF-10, ZIF-11, ZIF-12, ZIF-14, ZIF-2, ZIF-20, ZIF-21, ZIF-23, ZIF-3, ZIF-4, ZIF-61, ZIF-62, ZIF-64, ZIF-65, ZIF-67, ZIF-68, ZIF-70, ZIF-71, ZIF-72, ZIF-73, ZIF-74, ZIF-75, ZIF-76, ZIF-77, ZIF-8, IRMOF-20, CAU-10, MIL-47, MIL-53, MIL-88, MIL-100, MIL-101, and MIL-125.

In addition, according to the present disclosure, the MOF may be MOF-5.

In addition, according to the present disclosure, the VOCs may be selected from the group consisting of benzene, toluene, ethylbenzene, and xylene.

According to the present disclosure, it is possible to provide a hybrid micro-gas chromatography column capable of simultaneously performing preconcentration of low-concentration volatile organic compounds (VOCs), which is the function of a preconcentrator, and separation of low-concentration VOCs, which is the function of a gas separation column, by coating the inner wall of a micro-gas chromatography column channel with a metal-organic framework (MOF). Therefore, it is possible to effectively achieve miniaturization of a portable gas chromatography (GC) system.

DETAILED DESCRIPTION

Figure 1:
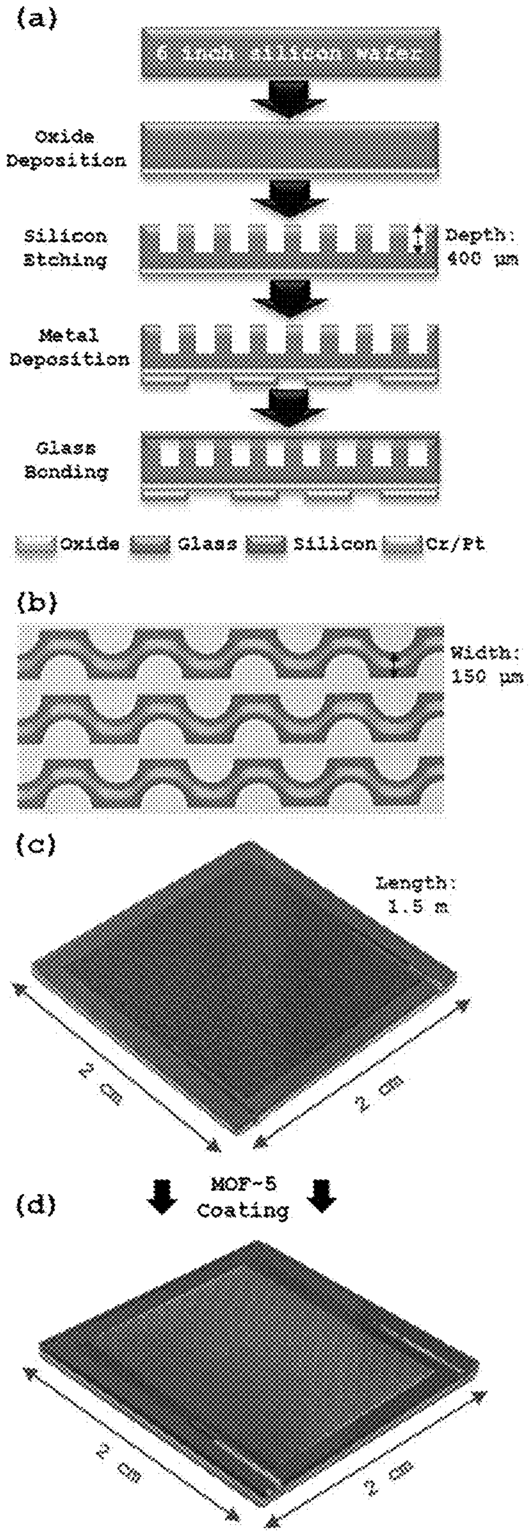
FIG. 1 shows a process of fabricating a hybrid μ-GC column of the present disclosure.

Hereinafter, preferred embodiments of a hybrid micro-gas chromatography column according to the present disclosure will be described in detail with reference to the accompanying drawings so that those skilled in the art to which the present disclosure pertains can easily carry out the present disclosure.

In each drawing of the present disclosure, the sizes or scales of structures may be enlarged or reduced from their actual sizes or scales for better illustration, and known components may not be depicted in the drawings to clearly show features of the present disclosure. Therefore, the present disclosure is not limited to the drawings. When describing the principle of preferred embodiments of the present disclosure in detail, detailed description of well-known functions and features will be omitted when it may unnecessarily obscure the subject matter of the present disclosure. In addition, it should be understood that the embodiments described in the specification and the configurations shown in the drawings are merely the most preferred examples of the present disclosure, but not cover all the technical spirits of the present disclosure, and thus there may be various equivalents and modifications capable of replacing them at the time of filing of the present disclosure.

FIG. 1 shows a process of fabricating a hybrid μ-GC column according to one embodiment of the present disclosure.

The hybrid μ-GC column of the present disclosure includes a metal-organic framework (MOF) coating the inner wall of a channel, wherein the MOF is used as an adsorbent and a stationary phase for volatile organic compounds (VOCs) so that preconcentration and separation of VOCs are performed simultaneously.

More specifically, the hybrid μ-GC column may include a channel formed on a substrate, bumps formed on the inner surface of the channel, and a metal-organic structure (MOF) coating the inner wall of the channel having the bumps formed thereon.

The bumps on the inner surface of the channel of the present disclosure may be alternately arranged to face each other on the inner surface of the channel so as to increase the interaction between a stationary phase and an analyte.

In the present disclosure, the inner wall of the channel having the bumps formed thereon is coated with a metal-organic framework (MOF), and the MOF serves as both an adsorbent and a stationary phase for volatile organic compounds (VOCs) passing through the channel of the hybrid μ-GC column, thereby making it possible to simultaneously perform preconcentration and separation of VOCs.

More specifically, the metal-organic framework (MOF) may include a metal ion and an organic ligand coordinated to the metal ion.

For example, the metal ion may include one selected from the group consisting of zirconium (Zr), aluminum (Al), iron (Fe), cobalt (Co), nickel (Ni), copper (Cu), zinc (Zn), manganese (Mn), magnesium (Mg), chromium (Cr), indium (In), vanadium (V), and gallium (Ga) ions, and is preferably a zinc (Zn) ion.

In addition, the organic ligand may include one selected from the group consisting of dicarboxylic acid, tricarboxylic acid, tetracarboxylic acid, and imidazolate, and is preferably terephthalic acid.

Meanwhile, in the present disclosure, the metal-organic framework may include one selected from the group consisting of UiO-66, UiO-67, UiO-68, MOF-5, MOF-69, MOF-74, MOF-177, MOF-199, MOF-508, MOF-801, MOF-804, MOF-805, MOF-806, MOF-808, MOF-812, MOF-841, NU-100, NU-110, NU-1000, DUT-49, DUT-52, DUT-53, DUT-67, ZIF-10, ZIF-11, ZIF-12, ZIF-14, ZIF-2, ZIF-20, ZIF-21, ZIF-23, ZIF-3, ZIF-4, ZIF-61, ZIF-62, ZIF-64, ZIF-65, ZIF-67, ZIF-68, ZIF-70, ZIF-71, ZIF-72, ZIF-73, ZIF-74, ZIF-75, ZIF-76, ZIF-77, ZIF-8, IRMOF-20, CAU-10, MIL-47, MIL-53, MIL-88, MIL-100, MIL-101, and MIL-125. Preferably, MOF-5 may be used from the viewpoint of being able to effectively preconcentrate and separate VOCs in the channel of the hybrid μ-GC column.

In addition, in the present disclosure, the VOCs may be selected from the group consisting of benzene, toluene, ethylbenzene, and xylene. Preferably, the hybrid μ-GC column has a preconcentration factor (PF) of 1,033 to 1,237 for volatile organic compounds selected from among benzene, toluene, ethylbenzene, and xylene, and has a separation resolution of 6.9 to 21.6, which expresses the degree of separation between two adjacent gas peaks in terms of gas separation performance.

Meanwhile, the channel of the present disclosure may have any one shape selected from among square, circular, and serpentine shapes. The channel preferably has a width of 140 to 200 μm and a depth of 300 to 450 μm, without being limited thereto.

Hereinafter, the present disclosure will be described in more detail with reference to specific examples.

Example 1: Experimental Materials and Methods

1.1: Experimental Materials

Zinc acetate, terephthalic acid, polyvinylpyrolidone (PVP, M.W.: 55,000), and N,N-dimethylformamide (DMF) were purchased from Sigma Aldrich (St. Louis, USA). In addition, liquidbenzene, toluene, ethylbenzene, and o-xylene were purchased from Sigma Aldrich, and gaseous analytes, including benzene, toluene, ethylbenzene, and o-xylene, were purchased from DK Gas (Hwaseong, Republic of Korea).

1.2: Fabrication of Hybrid Micro-Gas Chromatography Column Chip

In one example of the present disclosure, as shown in FIG. 1*a*, a 6-inch silicon wafer having a thickness of about 625 μm was prepared, and a serpentine-shaped column was fabricated on the front side of the silicon substrate through photolithography and deep reactive ion etching (DRIE). As shown in FIG. 1*b*, in order to increase the interaction between the stationary phase and the analytes, bumps (75 μm radius) were formed along the fluidic path. The bumps on the inner surface of the column were alternately arranged to face each other at intervals of about 150 μm. The fabricated hybrid μ-GC column had a column length of 1.5 μm, a channel width of 150 μm, and a channel depth of 400 μm. On the backside of the silicon substrate, a micro-heater and a resistive temperature sensor were patterned for temperature control. As shown in FIG. 1*c*, the fabricated hybrid μ-GC column had a size of 2 cm×2 cm. As shown in FIG. 1*d*, after coating with MOF-5, the color of the hybrid column turned slightly white.

1.3: Synthesis of MOF-5 Nanoparticles for Use as Adsorbent and Stationary Phase To synthesize MOF-5 particles, PVP (1.2 g) was first dissolved in 75 mL of DMF under magnetic stirring at 130° C. Next, terephthalic acid (20 mM, 1.66 g) dissolved in 20 mL of DMF was added to the solution. After 20 min, 10 ml of a DMF solution containing 4.4 g of zinc acetate was added to the above solution, and the resulting mixture was heated at 130° C. for 2 h under stirring. After allowing the mixture to cool down to room temperature, a powdery precipitate was observed to form, which was isolated from the supernatant by performing centrifugation at 3,000 rpm. The isolated residue was then washed three times with DMF. Finally, white powder was isolated and dried under vacuum overnight at 120° C. to achieve its activation.

1.4: Preparation of MOF-5-Coated Hybrid μ-GC Column

Before coating the hybrid μ-GC column with MOF-5, the hybrid μ-GC column was cleaned sequentially with 0.1 M HCl and 1 M NaOH and then rinsed with ultrapure water. Subsequently, the internal wall of the hybrid μ-GC column channel was coated with the synthesized MOF-5 through a dynamic coating method. Briefly, the hybrid μ-GC column was filled with 150 μL of a toluene suspension of MOF-5 (10 mg/mL). Then, the suspension was pushed through the capillary column at a rate of 40 cm/min to form a thin layer of MOF-5 on the inner wall of the hybrid μ-GC column channel. In order to inhibit the flowing speed of the suspension from increasing, a buffer capillary column with a length of 0.5 μm was additionally connected. Notably, the constant speed of the plug has an important role in ensuring the regularity of the MOF-5 layer, which in turn affects column performance indices such as column resolution. After completion of the coating, column conditioning was performed by flowing nitrogen gas to flow through the column for 2 hours. Subsequently, additional conditioning was carried out using a temperature program in a GC-FID system as follows: starting at 40° C. for 120 min, temperature rise from 30° C. to 200° C. at a rate of 0.5° C./min, and staying at 200° C. for 120 min. In addition, for separation performance comparison, the inner wall of the same hybrid μ-GC column channel was coated with OV-1, which is a commercial non-polar stationary phase.

1.5: Characterization

The surface morphology and elemental composition of the synthesized MOF-5 particles and MOF-5-coated hybrid μ-GC column were determined using afield-emission scanning electron microscope (JSM-7610 F, JEOL, Japan) equipped with an energy-dispersive X-ray spectroscopy (EDS) instrument. The EDS spectra were collected using a 5 kV accelerating voltage (beam current: 30 μA) at a working distance of 8 to 10 mm under a vacuum state. Powder X-ray diffraction (XRD) patterns of the MOF-5 particles were recorded on an X-ray diffractometer system (D8 Advance, Bruker, Germany) equipped with Cu Kα radiation at 40.0 kV and 40.0 mA at room temperature. The MOF-5 powder was scanned at 20 values ranging from 3° to 500 at a scanning speed of 2°/min. In addition, thermogravimetric analysis (TGA) was carried out using the Discovery TGA (TA Instrument, Philadelphia, USA) at a heating rate of 5° C./min from 32° C. to 800° C. After the MOF-5 particles were degassed at 120° C. for 6 hours, $N_2$ adsorption-desorption measurements were performed using a BELSORP-max II analyzer (MicrotracBEL, Japan) at 77 K to determine the sample's Brunauer-Emmett-Teller (BET) surface area and pore size distribution.

Figure 2A:
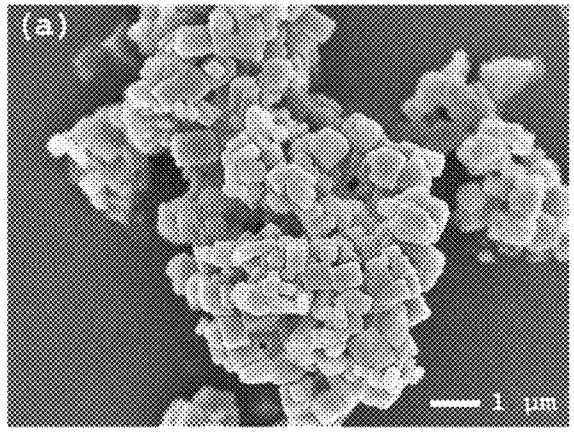
FIGS. 2*a*-2*f* show SEM images of the MOF-5 and hybrid μ-GC column of the present disclosure.
Figure 2B:
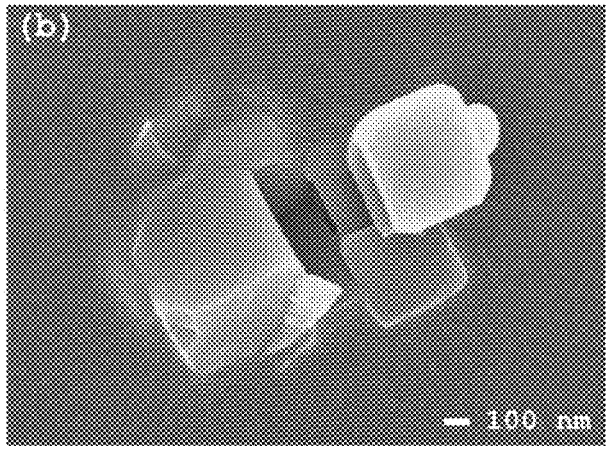
Figure 2C:
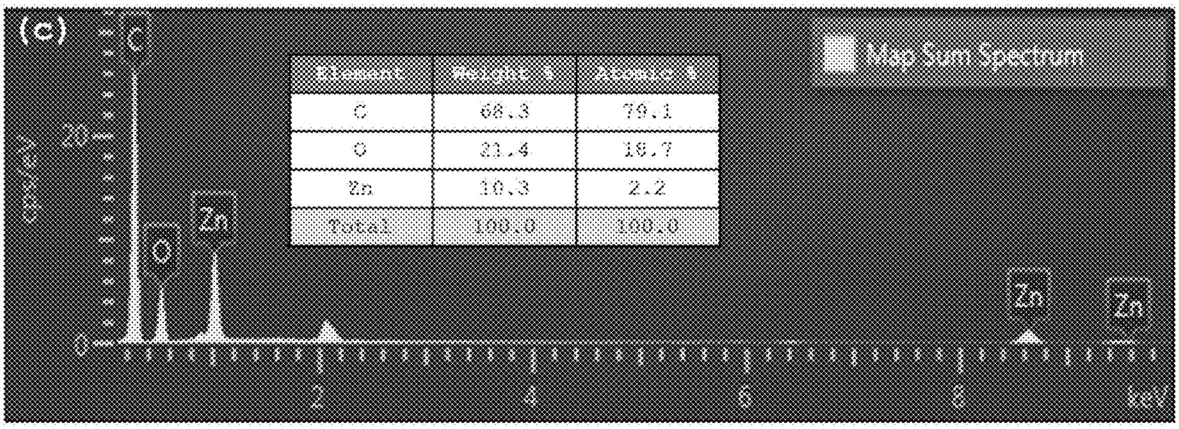
Figure 2D:
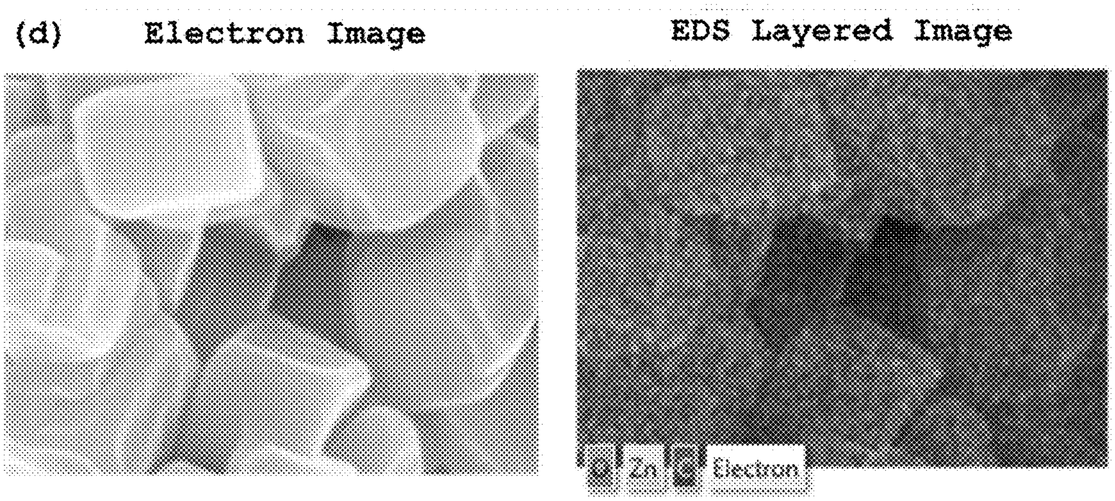

Example 2: Experimental Results 2.1: Morphology and Characterization of MOF-5 and Hybrid μ-GC Column FIGS. 2*a* and 2*b* show the surface of the as-synthesized MOF-5 particles. These high-magnification SEM images indicate that the particles are cubic in shape with an average size in the range of 400 to 600 nm. As a result of examining the chemical composition of the particles through the EDS spectrum and chemical element mapping, it could be seen that the MOF-5 nanoparticles contained only C, O, and Zn (FIGS. 2*c* and 2*d*).

Figure 2E:
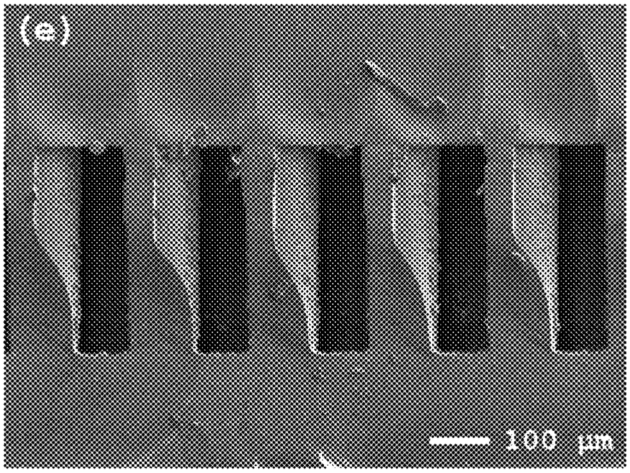
Figure 2F:
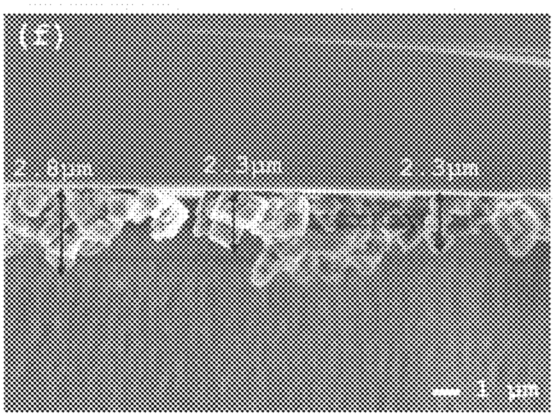

FIGS. 2*e* and 2*f* show the cross-section SEM images of the MOF-5-coated hybrid μ-GC column prepared after implementing the dynamic coating method. These high-magnification images indicate that the MOF-5 particles were coated on the inner wall of the capillary column, forming a stationary phase with a thickness of 2 to 3 μm.

Figure 3A:
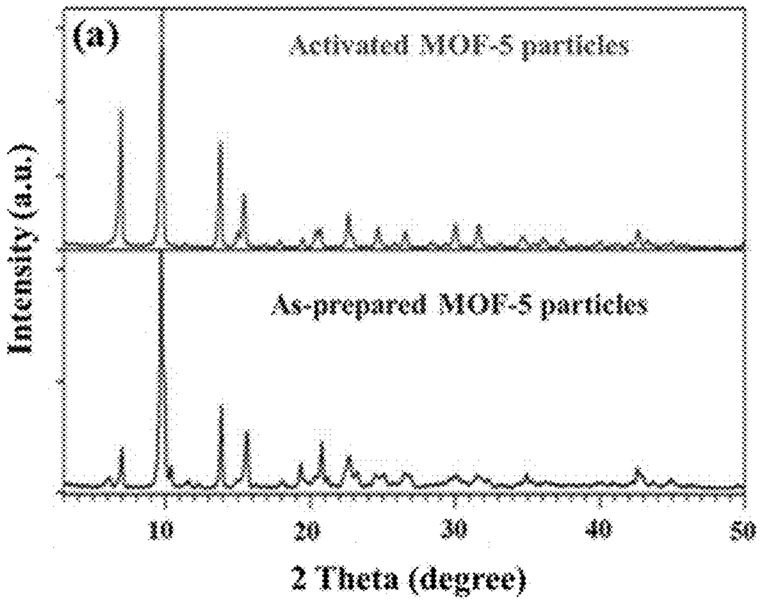
FIGS. 3*a*-3*c* depict graphs showing the characteristics of MOF-5 particles of the present disclosure.

FIG. 3*a* shows the XRD patterns of the as-prepared and activated MOF-5 particles. Notably, particle activation had been achieved by heating the particles at 120° C. under vacuum for 24 hours. The pores filled by the guest's molecules were removed after the activation process at 120° C., and sharp peaks were observed to appear. The four sharp peaks at 20 values of 6.9, 9.7, 13.7, and 15.4 exhibited the expected characteristics based on prior findings, indicating that crystalline MOF-5 particles were synthesized. Furthermore, the small peaks appearing in the 20 range of 30 to 400 confirmed the existence of trace amounts of free ZnO in the MOF-5 framework (JCPDS NO. 36-1451).

Figure 3B:
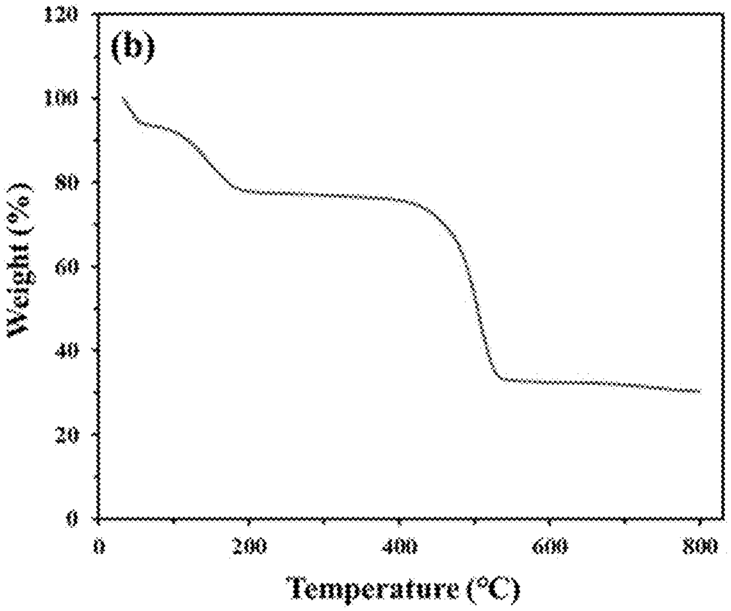

The thermal stability of the prepared MOF-5 was measured by thermogravimetric analysis. As can be seen in FIG. 3*b*, a 20% reduction in mass was observed as moisture and the DMF used a solvent were removed by raising the temperature to 180° C. In the range from 180° C. to 420° C., there was little loss of MOF-5 mass. However, in the range from 420° C. to 530° C., there was a huge decrease of about 40% in mass. This was because the MOF-5 particles were structurally decomposed into water and carbon dioxide. In the range from 530° C. to 800° C., only zinc oxide remained and no significant change occurred in the mass of 33%. Through TGA analysis, it was confirmed that the MOF-5 particles were thermally stable up to 420° C., indicating that these particles are sufficient to be used as an adsorbent and a stationary phase for a BTEX mixture.

Figure 3C:
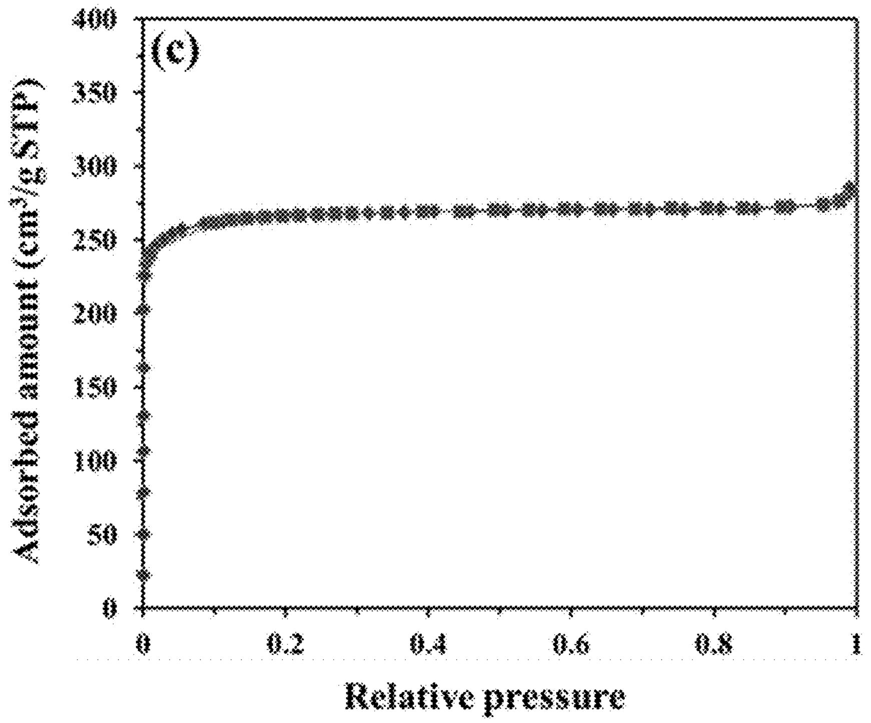

The micro-porosity of the as-synthesized MOF-5 nanoparticles was investigated by performing nitrogen sorption measurements at 77 K. The nanoparticles were activated under vacuum for 24 hours at 120° C. before the gas sorption experiments were conducted. As can be seen from the data shown in FIG. 3*c*, the MOF-5 nanoparticles exhibited a type 1 adsorption-desorption isotherm behavior, and the rapid increase of nitrogen adsorption at low relative pressure is indicative of the microporous structure of the as-prepared MOF-5 nanoparticles. The BET surface area and micro-pore volume of the MOF-5 nanoparticles were determined to have values of 1,069 $m^2/g$ and 0.44 $cm^3/g$, respectively, with a mean pore diameter of 1.64 nm.

2.2: FID Signal Calibration for Quantitative Preconcentration Performance

Figure 4A:
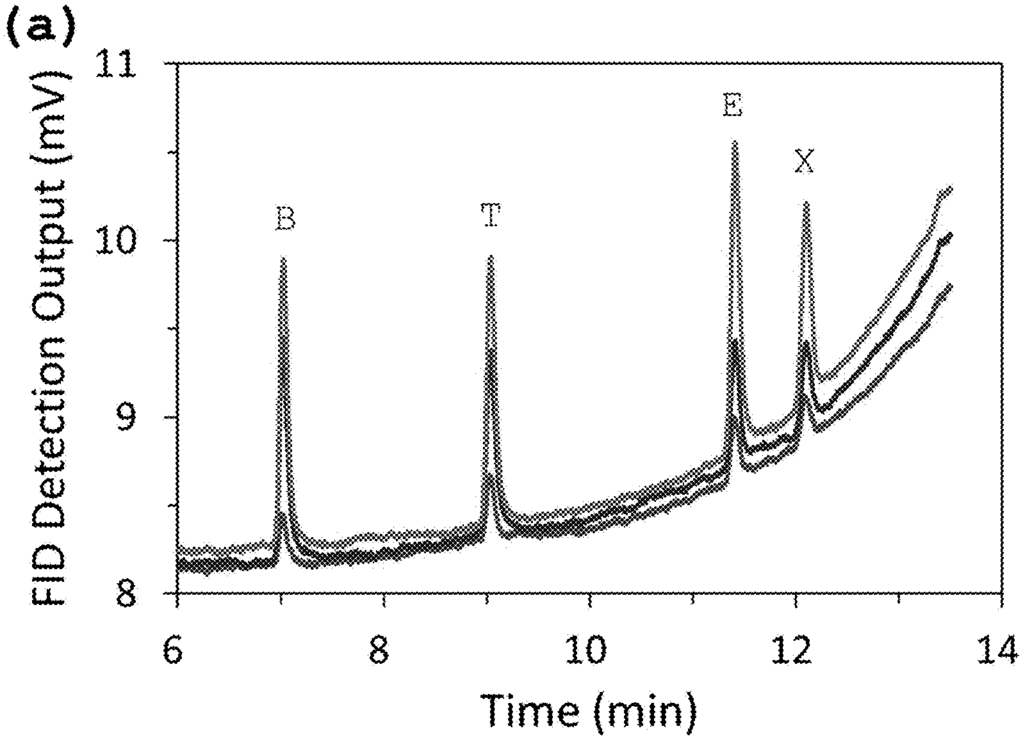
FIGS. 4*a* and 4*b* show chromatograms for BTEX mixtures separated using the hybrid μ-GC column of the present disclosure.
Figure 4B:
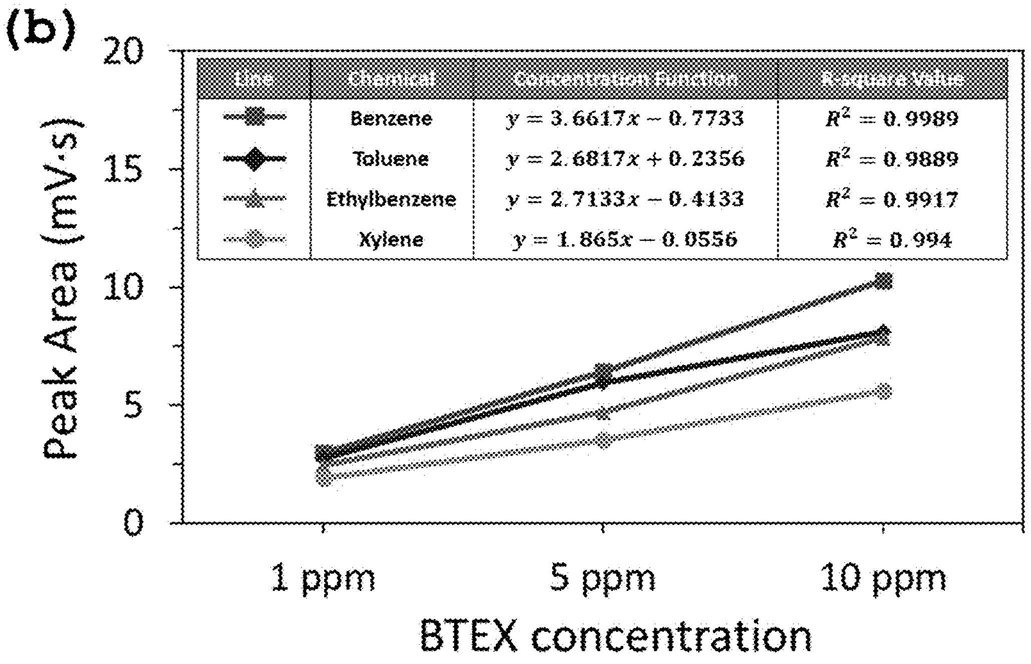

Preconcentration factor (PF) is a term for the performance index of a gas preconcentrator. In the present disclosure, the PF was defined as the ratio of the peak area obtained at the final concentration to the peak area obtained at the initial concentration. The initial concentration of a BTEX gas mixture is a controllable variable, but the BTEX concentration after preconcentration is unknown. The area of the peak drawn by the detected FID signal of the target gas is proportional to the concentration under the same experimental conditions and the same target gas. The peak area obtained at various concentrations can be made into a function through linear regression. Through this function, the initial and final concentration value measured after preconcentration can be determined, and the PF value can be obtained. A concentration calibration function for BTEX mixtures at various concentrations was obtained using the hybrid μ-GC column of the present disclosure. The hybrid μ-GC column was connected to the injector and detector in the GC-FID system. Also, the GC-FID system was set as follows: nitrogen was used as carrier gas at a flow rate of 1 mL/min, the oven temperature was set from 35° C. to 180° C. at a temperature rise rate of 10° C./min, the injector temperature was set at 200° C., the FID temperature was set at 250° C., and the valve was open at 0.01 min and closed at 0.11 min. After setting, BTEX mixtures with concentrations of 1, 5, and 10 ppm were diluted in dry pure nitrogen and continuously injected into a 6-port gas sampling valve (GSV) in the FID system. The BTEX gas mixtures at a flow rate of 5 mL/min constantly filled the 0.1-mL loop, and excess BTEX gas was vented. After starting the analysis, the BTEX mixture in the loop was injected into the hybrid μ-GC column at 0.01 min. The injected BTEX mixtures were separated and shown as chromatograms. FIG. 4*a* shows the chromatograms for the BTEX mixtures at 1, 5, 10 ppm, and FIG. 4*b* shows the concentration calibration functions based on BTEX concentrations and detected peak areas. In the hybrid μ-GC column, the R-squared values for benzene, toluene, ethylbenzene, and xylene were 0.9989, 0.9889, 0.9917, and 0.994, respectively, with an average value of 0.9934.

2.3: Preconcentration Performance of MOF-5-Coated Hybrid μ-GC Column

Figure 5A:
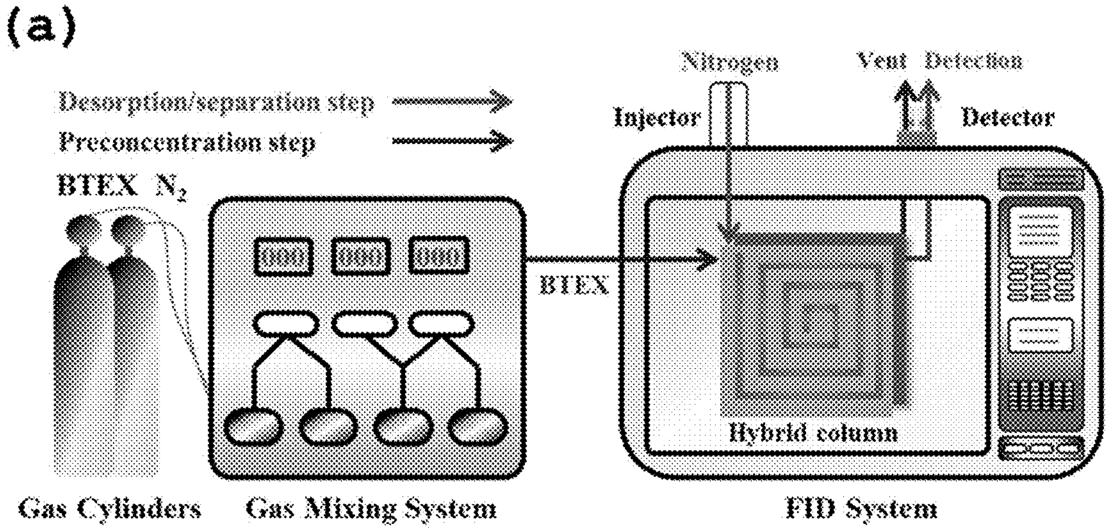
FIGS. 5*a*-5*c* show experimental results for preconcentration and separation tests performed using the hybrid μ-GC column of the present disclosure.
Figure 5B:
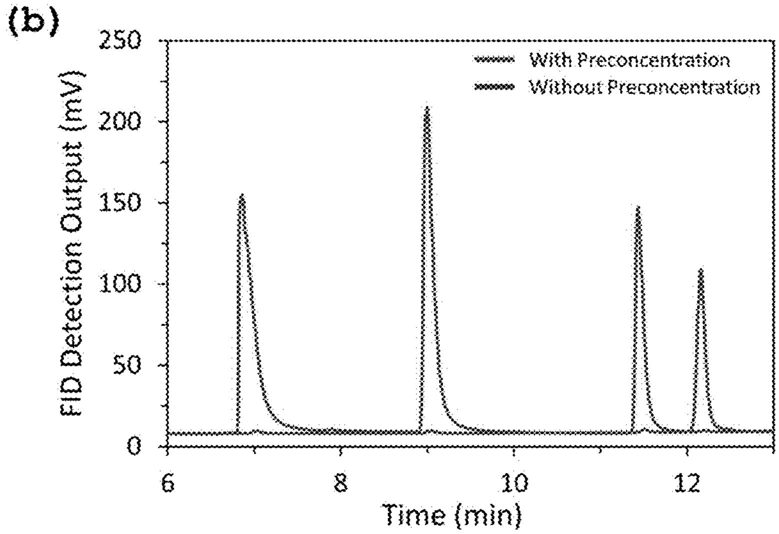
Figure 5C:
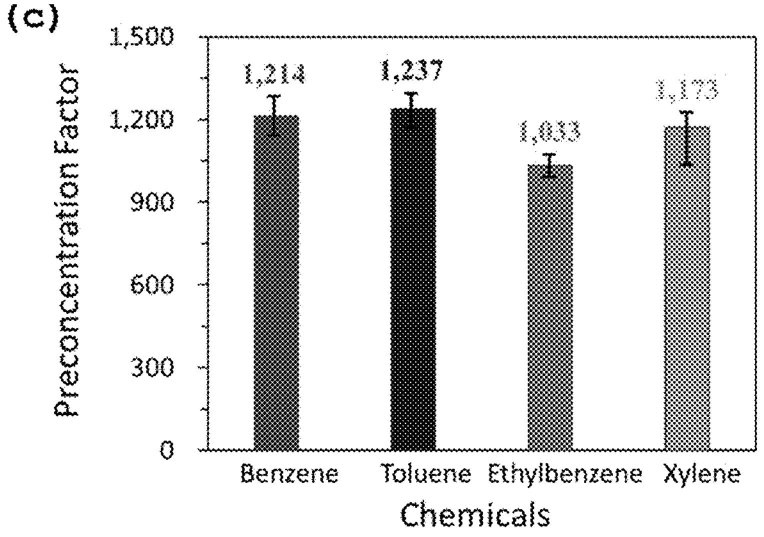

As shown in FIG. 5*a*, the preconcentration experiment is divided into two steps. The first step is an adsorption step (blue colored line), and the second step is a desorption/separation step (red colored line). In the adsorption step, the inlet of the hybrid μ-GC column is connected to a gas mixing system for flowing gaseous BTEX, and the outlet is connected to a detector for venting remaining gas after being adsorbed on the MOF-5 stationary phase. The BTEX at a concentration of 400 ppb was injected at 15 mL/min for 10 minutes using a gas mixer. After the adsorption step, the inlet of the column is connected to the injector of the GC-FID system, and the outlet is still connected to the detector (FID). In order to desorb BTEX gas adsorbed on the MOF-5 stationary phase, the GC-FID system were set as follows: nitrogen was used as a carrier gas at a flow rate of 1 mL/min, the oven temperature was set from 35° C. to 180° C. at a temperature rise rate of 10° C./min, the injector temperature was set at 200° C., and the FID temperature was set at 250° C. The reason why the starting temperature of the oven is low at 35° C. is to inhibit the adsorbed BTEX gas from being thermally desorbed before the desorption step. In addition, even if thermal desorption of the BTEX gas could be completed even at 150° C., the reason for increasing the oven temperature to 180° C. was to remove all residual gases and to provide an optimal environment for repeating the adsorption step. FIG. 5*b* shows chromatograms for preconcentration test results. In the same order as the boiling point, the first peak is benzene (80° C.) and the last peak is o-xylene (144° C.). There was an attempt to compare chromatograms between with preconcentration with an initial concentration of 400 ppb (red line) and without preconcentration, but the detection signal of the initial concentration of 400 ppb was too low to express. Thus, a chromatogram of 10 ppm of BTEX was inserted as a blue line for verifying the preconcentration effect. In five repeated experiments, the average peak areas were 1,778, 1,327, 1,121, and 875, respectively, in the order of BTEX. Considering that the peak areas detected at 10 ppm BTEX were 10.3, 8.1, 7.9, and 5.6, it was certain that the hybrid μ-GC column preconcentrated the initial BTEX gas mixture. The PF can be expressed as a multiple of the initial concentration versus the final concentration. According to the concentration calibration function obtained above, the PF value of each BTEX gas preconcentrated through the hybrid μ-GC column was calculated. FIG. 5*c* shows that the average PF values for BTEX at 400 ppb were 1,214, 1,237, 1,033, and 1,173, respectively. Through the comparison between reported μ-PC and our the hybrid μ-GC column of the present disclosure (Table 1), it was confirmed that the hybrid μ-GC column of the present disclosure showed a relatively high PF value, even considering the sampling volume (see Table 1 below).

TABLE 1

Preconcentration factors of the reported micro preconcentrators for BTEX gas.

| Adsorbent | DPO | Activated carbon | Graphitized carbon | DPO | CNTsponge | Silicondioxide | MOF-5 Foam | MOF-5(the present disclosure) |
|---|---|---|---|---|---|---|---|---|
| Sampling volume (mL) | 1,200 | 12,000 | 2,000 | 180 | 100 | 7 | 50 | 150 |
| PF value | 200 | 800 | 200 | 50 | 300 | 25 | 144 | 1,033-1,237 |

2.4 Separation Performance of MOF-5-Coated Hybrid μ-GC Column

In the present disclosure, separation performance was evaluated using separation resolution ($R_s$). The $R_s$ value is a quantitative indicator of the degree of separation that shows how far the chromatography peak due to a specific compound is separated from its adjacent peak. If the two peaks are assumed to have a Gaussian distribution and have the same height and width, an $R_s$ value of 1.5 is indicative of a mutual overlap of 0.15%. Usually, the chromatogram of a sample separated through a column characterized by a relatively small HETP value has a relatively high $R_s$ value. Additionally, if peak broadening and tailing are severe, the $R_s$ value will drop. The $R_s$ value can be calculated from acquired chromatograms using the following equation (1):

$$R_s = \frac{t_{r2} - t_{r1}}{\frac{1}{2}(t_{w2} + t_{w1})} \quad (1)$$

Figure 6A:
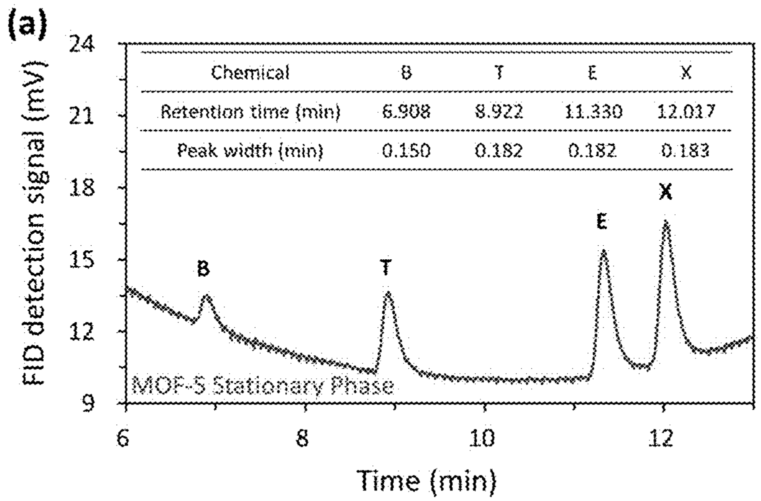
FIGS. 6*a*-6*c* show graphs comparing the separation performance of the MOF-5 stationary phase of the present disclosure with that of a commercial OV-1 stationary phase.
Figure 6B:
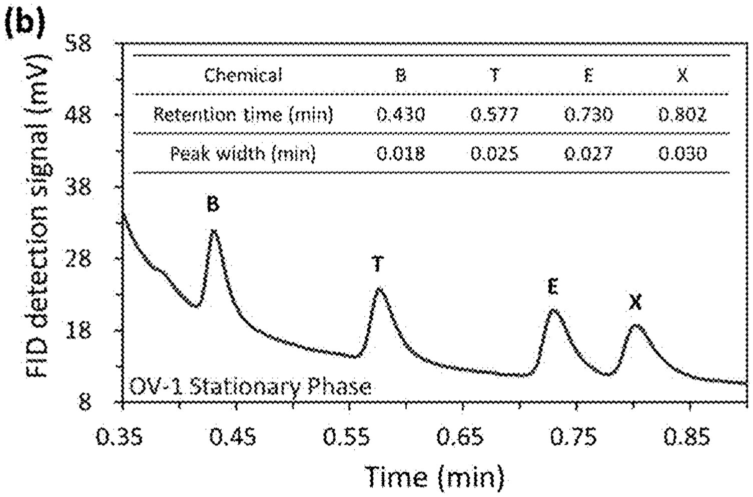
Figure 6C:
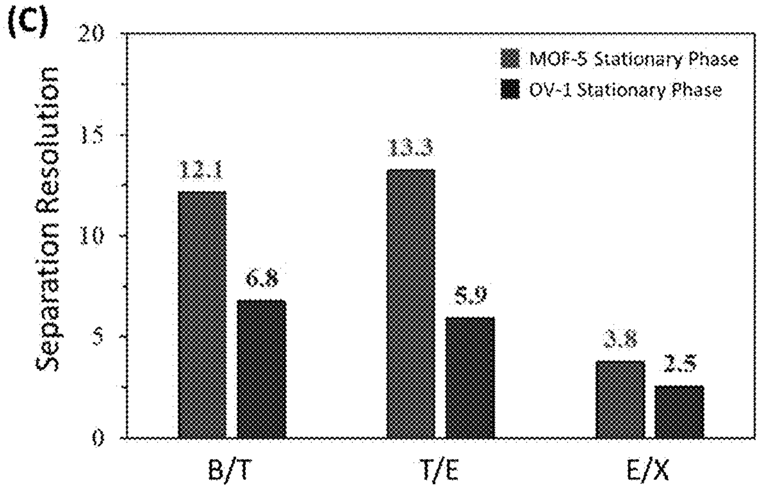

In equation (1) above, $t_{ri}$ is the retention time of two adjacent peaks, and $t_{wi}$ is the width of each peak. The $R_s$ values for every pair of adjacent peaks in the chromatograms obtained for the BTEX mixture were calculated, and the obtained results including peak width, retention time, and $R_s$ values are shown in FIGS. 6*a*-6*c*. Since $R_s$ is a number between adjacent peaks, there are three values, B/T, T/E, and E/X. The $R_s$ values for the BTEX mixture were 13.707, 21.609, and 6.867, respectively, and the average was 14.061, indicating that the BTEX mixture was completely separated. Also, the separation performance of the MOF-5 stationary phase was compared to that of a commercial OV-1 stationary phase. The $R_s$ value is strongly affected by the width of the peak, which is dependent on the concentration of target analyte. Therefore, in order to compare $R_s$ values at the same concentration, a liquid BTEX mixture at a concentration of 0.1%, obtained by diluting liquid BTEX with methanol solvent, was used as analyte. FIGS. 6*a* and 6*b* are the BTEX separation chromatograms obtained using MOF-5 and OV-1 coated μ-GC columns, respectively. In addition, FIG. 6*c* shows the $R_s$ values for the two different stationary phase-coated columns. The $R_s$ value of the MOF-5 stationary phase was 3.8 to 13.2 with an average of 9.7, and the $R_s$ value of the OV-1 stationary phase was 2.5 to 6.8 with an average of 5.1. It was confirmed that the separation resolution of the MOF-5 stationary phase was about 1.9 times higher.

2.5: Conclusion

In the present disclosure, the present inventors have demonstrated the synthesis of MOF-5 nanoparticles with a surface area of 1,069 $\mu m^2/g$ and a micro-pore volume of 0.44 $cm^3/g$. Also, the hybrid μ-GC column, which has a size of 20 mm×20 mm, was fabricated by the MEMS process. The inner wall of the hybrid μ-GC column was coated with the synthesized MOF-5 particles using a simple dynamic coating process. It was confirmed that the hybrid μ-GC column fabricated as described above was capable of both preconcentration and separation of VOCs, and was effectively capable of gas preconcentration and separation for the BTEX gas mixture as an example. In terms of gas preconcentration, the PF value was 1,033 to 1,237. In the separation experiment conducted simultaneously with the preconcentration experiment, the $R_s$ value was 3.8 to 13.2, indicating perfect separation. Furthermore, as a result of comparing the $R_s$ value of the MOF-5 stationary phase with that of a commercial OV-1 stationary phase using the BTEX mixture at a concentration of 0.1%, the MOF-5 stationary phase exhibited an $R_s$ value which is 1.9 times higher than the OV-1 stationary phase. Accordingly, the hybrid μ-GC column of the present disclosure not only has excellent preconcentration and separation performance, but also has the advantage of being able to simultaneously perform preconcentration and separation using one device. Therefore, the hybrid μ-GC column of the present disclosure has a great potential to be used as a core device for a compact GC system for indoor air quality analysis.

While the present disclosure has been described with reference to the particular illustrative embodiments, it will be understood by those skilled in the art to which the present disclosure pertains that the present disclosure may be embodied in other specific forms without departing from the technical spirit or essential characteristics of the present disclosure. Therefore, the embodiments described above are considered to be illustrative in all respects and not restrictive. Furthermore, the scope of the present disclosure is defined by the appended claims rather than the detailed description, and it should be understood that all modifications or variations derived from the meanings and scope of the appended claims and equivalents thereto are included within the scope of the present disclosure.

What is claimed is:

1. A portable gas chromatography (GC) system comprising a hybrid micro-gas chromatography column, wherein the hybrid micro-gas chromatography column comprises a metal-organic framework (MOF) coating an inner wall of a channel, wherein the MOF is used as an adsorbent and a stationary phase for volatile organic compounds (VOCs) so that preconcentration and separation of VOCs are performed simultaneously in one column, wherein the hybrid micro-gas chromatography column comprises a silicon substrate, the channel formed on a front surface of the silicon substrate, and a micro heater and a resistance temperature sensor formed on a back surface of the silicon substrate opposite from the front surface, wherein the channel has a shape of square having a width of 140 to 200 μm and a depth of 300 to 450 μm, and wherein a preconcentration factor (PF) is 1,033 to 1,237 for VOCs selected from the group consisting of benzene, toluene, ethylbenzene, and xylene.

2. The portable GC system according to claim 1, wherein the MOF comprises a metal ion and an organic ligand coordinated to the metal ion, wherein the metal ion is selected from the group consisting of zirconium (Zr), aluminum (Al), iron (Fe), cobalt (Co), nickel (Ni), copper (Cu), zinc (Zn), manganese (Mn), magnesium (Mg), chromium (Cr), indium (In), vanadium (V), and gallium (Ga) ions, and the organic ligand is selected from the group consisting of dicarboxylic acid, tricarboxylic acid, tetracarboxylic acid, and imidazolate.

3. The portable GC system according to claim 1, wherein the MOF is selected from the group consisting of UiO-66, UiO-67, UiO-68, MOF-5, MOF-69, MOF-74, MOF-177, MOF-199, MOF-508, MOF-801, MOF-804, MOF-805, MOF-806, MOF-808, MOF-812, MOF-841, NU-100, NU-110, NU-1000, DUT-49, DUT-52, DUT-53, DUT-67, ZIF-10, ZIF-11, ZIF-12, ZIF-14, ZIF-2, ZIF-20, ZIF-21, ZIF-23, ZIF-3, ZIF-4, ZIF-61, ZIF-62, ZIF-64, ZIF-65, ZIF-67, ZIF-68, ZIF-70, ZIF-71, ZIF-72, ZIF-73, ZIF-74, ZIF-75, ZIF-76, ZIF-77, ZIF-8, IRMOF-20, CAU-10, MIL-47, MIL-53, MIL-88, MIL-100, MIL-101, and MIL-125.

4. The portable GC system according to claim 1, wherein the MOF is MOF-5.

* * * * *